(12) United States Patent
Banhazi

(10) Patent No.: US 11,609,006 B2
(45) Date of Patent: Mar. 21, 2023

(54) AIR QUALITY MEASURING APPARATUS USED IN ANIMAL HUSBANDRY

(71) Applicant: PLF Agritech Pty Ltd, Toowoomba (AU)

(72) Inventor: Thomas Banhazi, Toowoomba (AU)

(73) Assignee: PLF AGRITECH PTY LTD, Toowoomba (AU)

( * ) Notice: Subject to any disclaimer, the term of this patent is extended or adjusted under 35 U.S.C. 154(b) by 0 days.

(21) Appl. No.: 17/088,803

(22) Filed: Nov. 4, 2020

(65) Prior Publication Data

US 2021/0131688 A1 May 6, 2021

(30) Foreign Application Priority Data

Nov. 5, 2019 (AU) ................................ 2019904161

(51) Int. Cl.
| | | |
|---|---|---|
| *F24F 11/30* | (2018.01) | |
| *F24F 110/10* | (2018.01) | |
| *F24F 110/64* | (2018.01) | |
| *F24F 110/70* | (2018.01) | |

(52) U.S. Cl.
CPC .......... *F24F 11/30* (2018.01); *F24F 2110/10* (2018.01); *F24F 2110/64* (2018.01); *F24F 2110/70* (2018.01)

(58) Field of Classification Search
CPC .... F24F 11/30; F24F 2110/10; F24F 2110/64; F24F 2110/70; F24F 2110/20; Y02B 30/70; G01N 33/0075; G01N 33/0004; G01N 33/004; G01N 33/0029; G01N 33/0054; G01N 1/2273
See application file for complete search history.

(56) References Cited

U.S. PATENT DOCUMENTS

| | | | |
|---|---|---|---|
| 2006/0234621 A1* | 10/2006 | Desrochers | F24F 3/044 454/239 |
| 2014/0260692 A1* | 9/2014 | Sharp | G01N 1/2273 73/863.23 |
| 2015/0323427 A1* | 11/2015 | Sharp | G01N 1/2273 73/863.23 |
| 2017/0350611 A1* | 12/2017 | Su | F24F 11/0001 |
| 2018/0290104 A1* | 10/2018 | Jong | F24F 8/10 |
| 2019/0232210 A1* | 8/2019 | Hur | F24F 8/90 |
| 2019/0331589 A1* | 10/2019 | Van Den Hoogen | G01N 15/06 |

* cited by examiner

*Primary Examiner* — Charles R Kasenge
(74) *Attorney, Agent, or Firm* — Sand, Sebolt & Wernow Co., LPA

(57) ABSTRACT

An air quality measurement apparatus, including a first air inlet providing a first air sample within a space; a device which is configured to draw an air sample through the first air inlet and over a sensor, wherein the sensor measures the first air sample for a first environmental condition; an air outlet for expelling the first air sample from said apparatus; a second air inlet providing a second air sample externally from the space to measure the first environmental condition whereby the second environmental condition is compared to the first environmental condition to provided data to a user regarding the difference.

14 Claims, 4 Drawing Sheets

AIR QUALITY MEASURING APPARATUS USED IN ANIMAL HUSBANDRY

BACKGROUND

Numerous airborne pollutants are found in enclosed livestock areas such as piggery buildings. These pollutants may include ammonia, carbon dioxide, carbon monoxide, methane, hydrogen sulfide, airborne microorganisms, inhalable and respirable particles, and negatively affect the health and welfare of both animals and humans. Exposure to high concentrations of these airborne pollutants can potentially result in a reduction of the health, welfare and the production efficiency of various livestock species. Pollutant emissions from intensive livestock production facilities are closely associated with internal pollution levels. Airborne emissions from livestock buildings contribute to odour and environmental pollution. It is also believed that the pollutants may contribute to global warming. Occupational Health & Safety (OH&S) issues are increasingly important to both employers and employees within not only the pig industry but other animal husbandry industries. The ability of large operations to retain staff is related to working conditions and acceptable air quality in livestock buildings.

Accurate measurement of gas and dust concentrations in intensive livestock production facilities is essential for ensuring that a high level of animal welfare, worker safety, and farm production is achieved. The risk of exposure to gasses and dust for humans and livestock is well documented. Exposure to high levels of dust results in respiratory problems in workers. Similar results have been observed in livestock under these conditions. Dust is also acknowledged as being involved in the transmission of disease.

The gaseous airborne pollutants that are of critical importance in livestock buildings are ammonia, carbon dioxide, carbon monoxide, hydrogen sulfide, and methane. Other airborne pollutants that are important are inhalable and respirable particles in both a viable and nonviable form. Ammonia is considered an important gas in these environments since it has been observed that excess exposure has a detrimental effect on animal health. Ammonia has also been implicated in problems associated with the reception of pheromones which are involved in reproduction. Of further concern are the implications of high ammonia emission on sensitive ecosystems. High levels of ammonia can also have a corrosive effect on a building when combined with water, such as condensation on the roofs of buildings.

Carbon dioxide levels are of concern both because of their deleterious effect on animal health and the implications to global warming. The level of carbon dioxide also gives an indication of the rate of ventilation in confined animal housing. Ammonia and carbon dioxide can be detected in a variety of ways; Fluorescence, chemiluminescence photometry, non-dispersive infra red, passive sampling and electrochemical sensors.

Scientific air quality monitoring kits have been used in Australia since the early 1990's to monitor air pollutant concentrations and environmental quality in piggery buildings. These monitoring devices are however expensive, require regular calibrating and are not designed to be used by non-scientific personnel. Furthermore, the monitoring kits are not robust enough to be used in the working environment of an agricultural setting and consequently are easily damaged.

Furthermore, they do not measure the air quality continuously in real time and do not determine if a particular building is within its predicted operational parameters.

In addition, over time the kits may lose their accuracy and reliability because the sensors may become blocked or compromised.

It is an object of the present invention to provide for a measurement system for key airborne pollutants in an enclosed and potentially in an outdoor environment, such as feedlots.

It is a further object of the present invention to provide for an accurate, low-cost and user-friendly air quality measurement apparatus to monitor in real time the environmental quality in livestock production facilities thereby improving the internal building environment and reducing pollutant emissions.

SUMMARY

Therefore in one form of the invention there is proposed an air quality measurement apparatus, including:

at first air inlet providing a first air sample within a space;

a device which is configured to draw an air sample through the first air inlet and over a sensor, wherein the sensor is adapted to measure the first air sample for a first environmental condition;

an air outlet for expelling the first air sample from said apparatus;

a second air inlet providing a second air sample externally from the space to measure the first environmental condition whereby the second environmental condition is compared to the first environmental condition to provided data to a user regarding the difference.

In preference at pre-determined intervals the second air inlet provides a continuous flow or air for a pre-set time to remove any contaminates from the sensor.

In preference there are pluralities of sensors measuring different parameters such as but not limited to $CO_2$, ammonia and dust.

In preference there are a plurality of other sensors measuring temperature, relative humidity and gas concentration.

In preference a flow rate through the gas concentration sensors is in the range of under 1 L/min.

In preference the apparatus includes a single board computer for recording information from said sensors.

In preference the dust concentration sensor is adapted to measure the concentration of respirable particles less than 5 µm in size. In preference the dust concentration sensor includes a plurality of filters to determine the concentration of inhalable and respirable particles. A photo-electrical sensor is also used to ensure that all information collected can be downloaded remotely and dust concentration related information is collected continuously.

BRIEF DESCRIPTION OF THE DRAWINGS

The accompanying drawings, which are incorporated in and constitute a part of this specification and, together with the description, serve to explain the advantages and principles of the invention. In the drawings.

DESCRIPTION OF THE PREFERRED EMBODIMENTS

Figure 1:
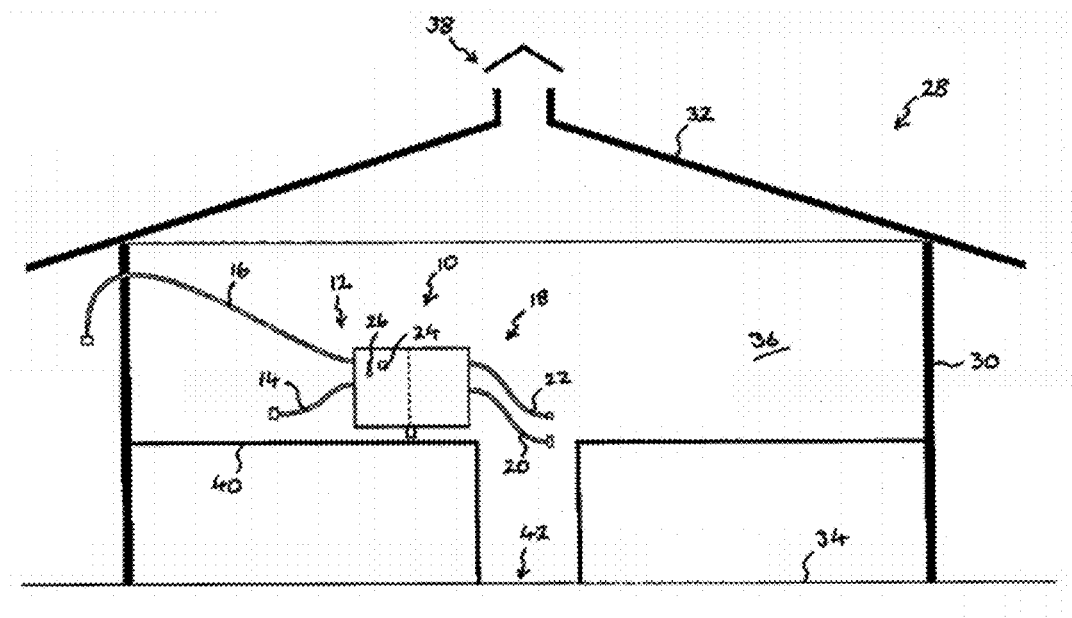
FIG. 1 is a side view of an air quality measurement apparatus installed in a livestock building.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Referring now to the Figures in detail there is illustrated an apparatus 10 for testing air quality, including a gas concentration monitoring device 12 with associated pipes or sample lines 14 and 16, a dust monitoring device 18 with associated pipes or sample lines 20 and 22, a relative humidity sensor 24 and a temperature sensor 26. The apparatus 10 is housed within an intensive livestock production facility such as a piggery building 28. The building 28 includes walls 30, roof 32 and floor 34 which define a building interior 36. The building 28 may further include an A-ridge vent 38, compartments for livestock 40 where each compartment may house a number of separate pens, as well as a walkway 42.

Some environmental variables are crucial to the efficient management of piggery buildings 28. In Australia the important environmental variables to be measured are; shed temperature, humidity, shed dust concentration, shed carbon dioxide concentration, and shed ammonia concentration.

The components of the gas concentration monitoring device 12 and dust monitoring device 18 are contained within a protective enclosure. The enclosure provides a high degree of protection from dust, water and physical impact, ensuring that the apparatus 10 is robust enough to be used in a working agricultural environment. The apparatus 10 includes a motor connected to mains power. It should however be appreciated that the apparatus 10 may include its own power source in the form of a rechargeable battery pack. The motor is connected to a pump that produces a vacuum which is used to draw air samples through the gas concentration monitoring device 12 and dust monitoring device 18.

The gas monitoring device 12 includes a carbon dioxide sensor and an ammonia sensor. These sensors determine the concentration of carbon dioxide and ammonia in the air sample received from the compartments. The gas monitoring device 12 includes a single board computer (SBC) or any other computing device that is local to the device or wirelessly connected to the device which retrieves information from various sensors. In this way the SBC 58 is able to record the concentrations of ammonia and carbon dioxide, temperature, and humidity at regular intervals throughout the measuring period. The SBC also records the site identification and has the capacity has the capacity to record multiple readings and provide the information to external computing devices for further analysis via a built-in modem. The gas concentration monitoring device 12 includes one of which is located within the compartment. In this way air from within the compartment can be assessed for gaseous pollutants, such as carbon dioxide and ammonia. The other is located outside the building 28. In this way an air sample can be taken from the external environment. This sample from outside the building serves several purposes; it clears the sampling lines, zeros the ammonia monitoring head and records external air quality conditions. The sample of the external air can be used for comparison purposes to analyse the sample taken from the internal environment. Therefore, in environments where there are high ammonia or carbon dioxide levels in the natural environment the relative internal gaseous conditions of the compartment can be calculated. Because of the construction of the ammonia sensor it has to be purged at regular intervals with air that has a low concentration of ammonia. It may therefore be preferable or desirable to have the apparatus operate to draw external air through the apparatus for a pre-set period of time to "clean" the equipment (for some 10 minutes), then a set time to take measurements (for some 30 minutes) and then a set time to "rest" (for some 20 minutes).

As illustrated in the monitoring device includes a solenoid valve. In this way air can be drawn through by vacuum pump 50. Air is drawn in depending on the configuration of the solenoid valve 80. The air then passes through over carbon dioxide sensor 54 and ammonia sensor 56. It is envisaged that the carbon dioxide sensor 54 will be an infrared sensor whilst the ammonia sensor 56 will be an electrochemical sensor, however, it should be appreciated that the present invention is not limited to the use of these types of sensors.

It should however be appreciated that the measurement interval and averaging interval can be changed without deviating from the scope of the present invention. At the end of each data collection period the raw data is sent to a central cloud-based database for further analysis and automated reporting or to any other database. The rate at which the air is drawn is able to be altered by an air flow gauge to control the air flow around 0.7-0.8 L/min. The monitoring device 12 consists of Teflon tubes and stainless-steel fittings to ensure there is no degradation of the sample or absorption of ammonia into non-compatible materials.

The dust monitoring device 18 preferably measures the concentration of inhalable particles which are less than 20 μm, and respirable particles which are less than 5 μm. The measurement device 88 for calculating the concentration of inhalable particles (<20 μm) includes an inlet, an in-line pre filter 92, a Venturi tube 94 and a sample filter 96. The terminal end of pipe includes a filter which is configured to allow only particles of a size less than 20 μm to enter tube 20. Similarly, a measurement device for calculating the concentration of respirable particles (<5 μm) includes an inlet, an in-line pre filter 104, a Venturi tube 94 and a sample filter.

It is envisaged that the sampling period will be greater or equivalent to 48 hours to ensure that the sample will be representative. With continuous measurements longer timer frames are more suitable so that the measurements are stabilised.

Figure 2:
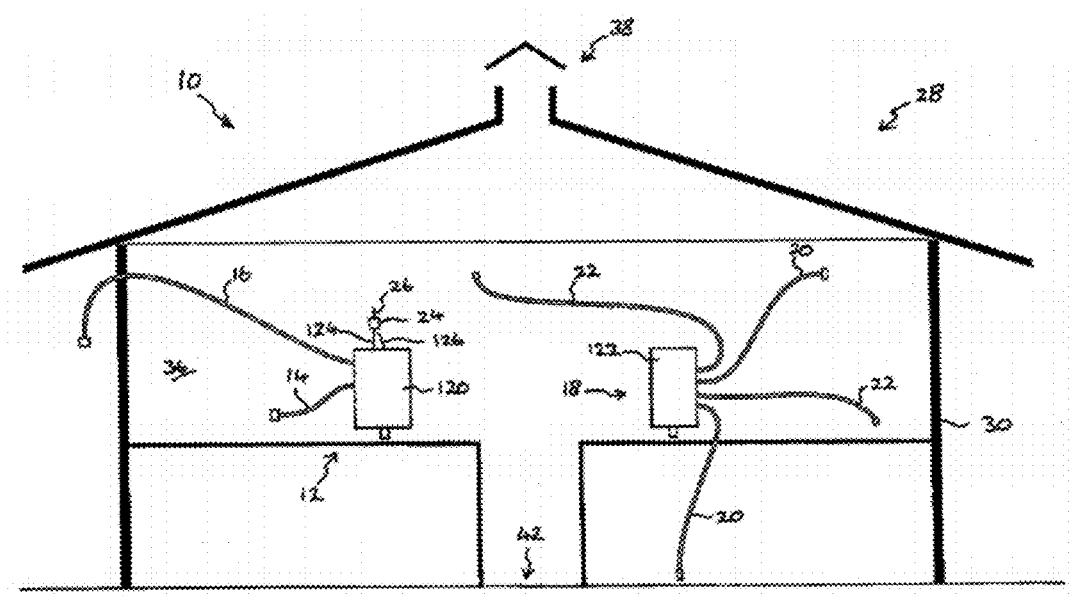
FIG. 2 is a side view of a livestock building illustrating a second embodiment of an air quality measurement apparatus.

After sampling, the filters are weighed in a controlled environment room using a microbalance to determine the weight of the particle mass collected on the filters 96. The pre-weighing of the new filters and weighing of the same filters after sampling is done under the same environmental conditions as is common in the art. Because the dust monitoring device 18 requires a high capacity vacuum pump it may include a heat shield to protects sensors. In an alternate embodiment, as illustrated in FIG. 2, the components of the gas concentration monitoring device 12 and those of the dust monitoring device 18 can be housed within separate enclosures 120 and 122. This ensures that the sensors are not affected by the heat of the motor or pump, since a large pump is required to operate the dust monitoring device 18. It may also be beneficial to have the monitoring devices 12 and 18 spatially separated within the building 28. Different parts of the building 28 may be affected by different environmental factors and the actual design of the building may result in gaseous pollutants building up in one area whilst airborne dust may build up in another area of the building 28. For example, air movement would dissipate gas build up while at the same time stir up dust particles. Obviously, each of the monitoring devices 12 and 18 would require their own motors and vacuum pumps and would be independently connected to a power source.

Figure 3:
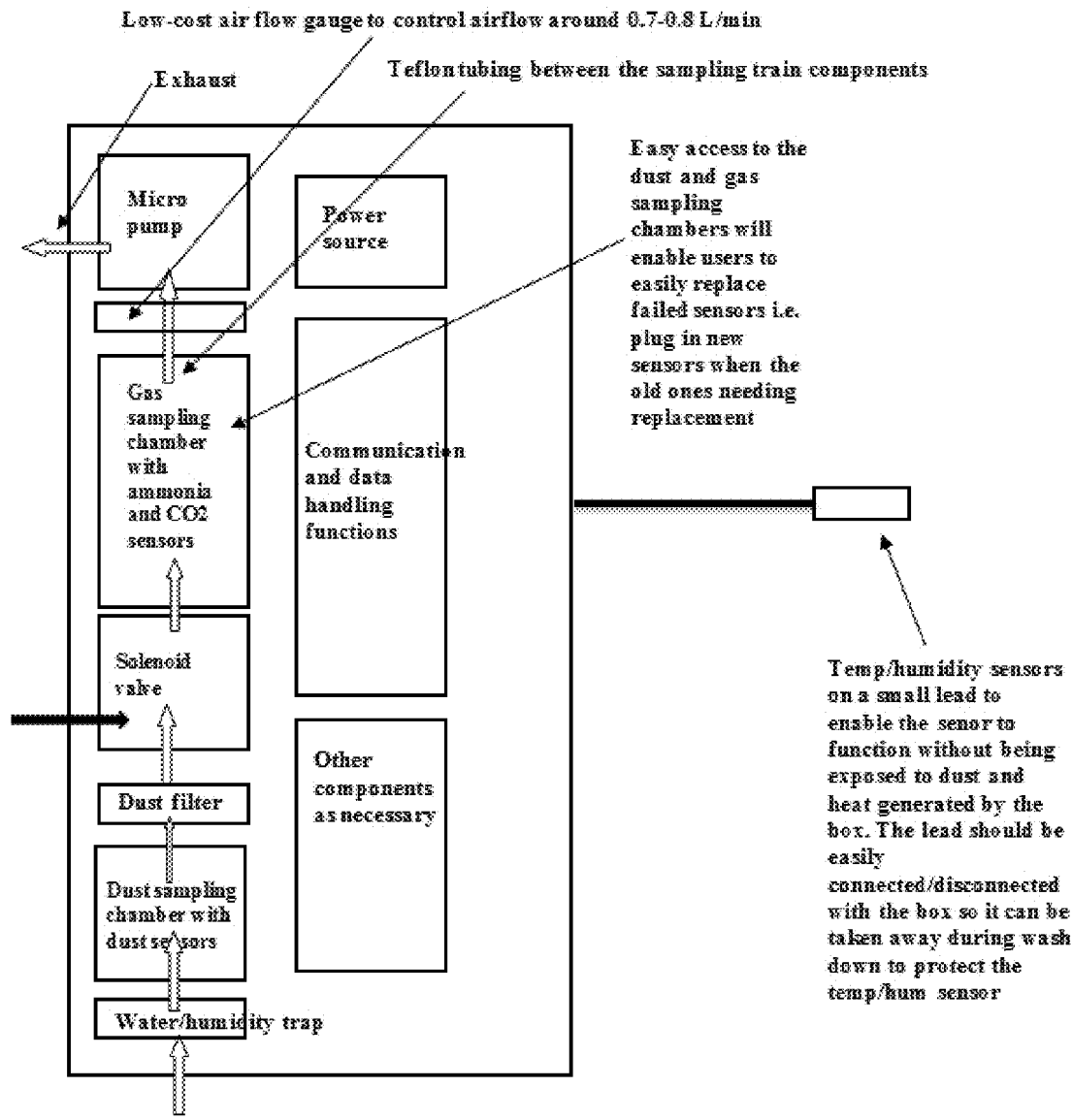
FIG. 3 is a schematic diagram of the apparatus.
Figure 4:
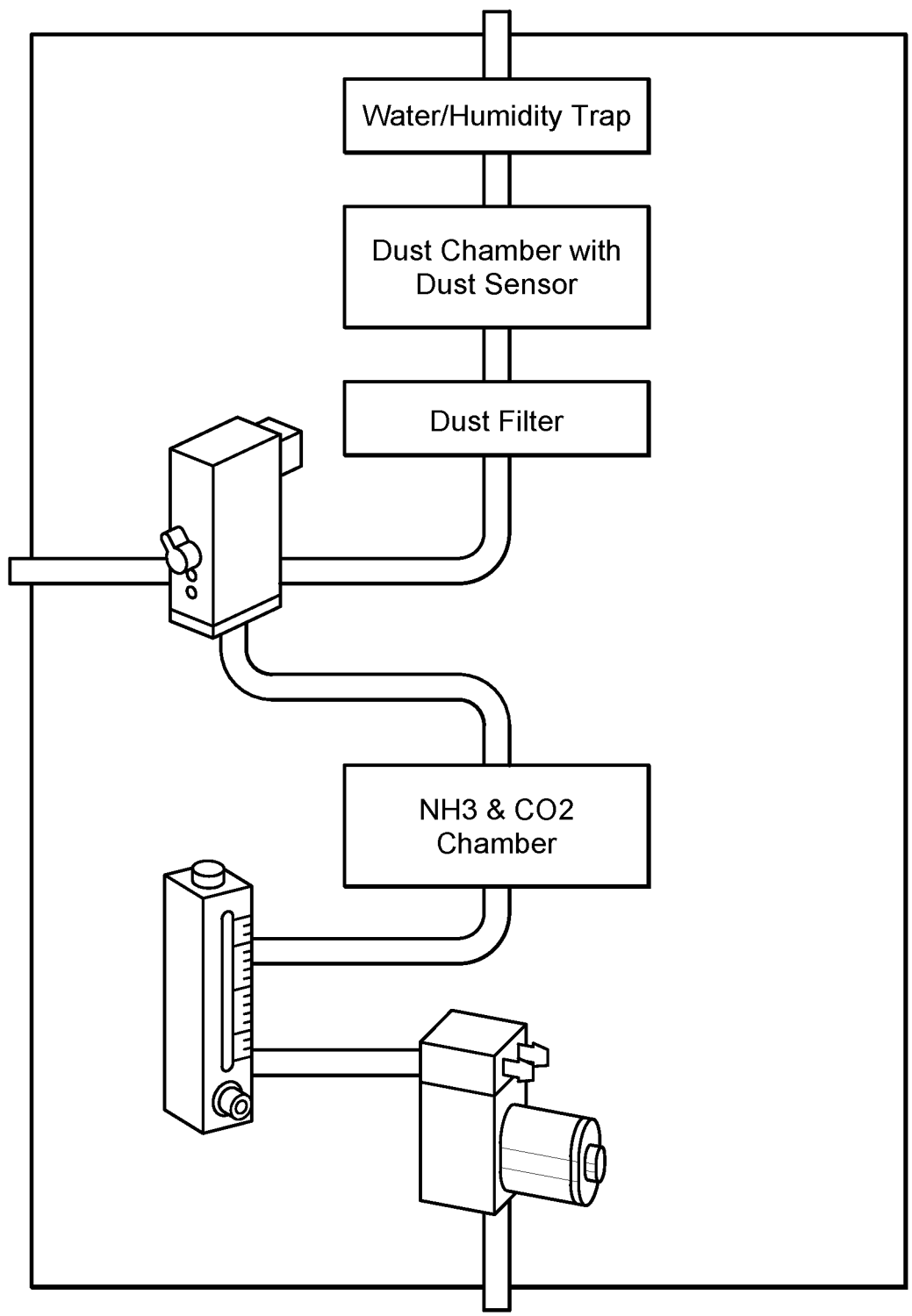
FIG. 4 is a further schematic diagram of the apparatus.
Figure 5:
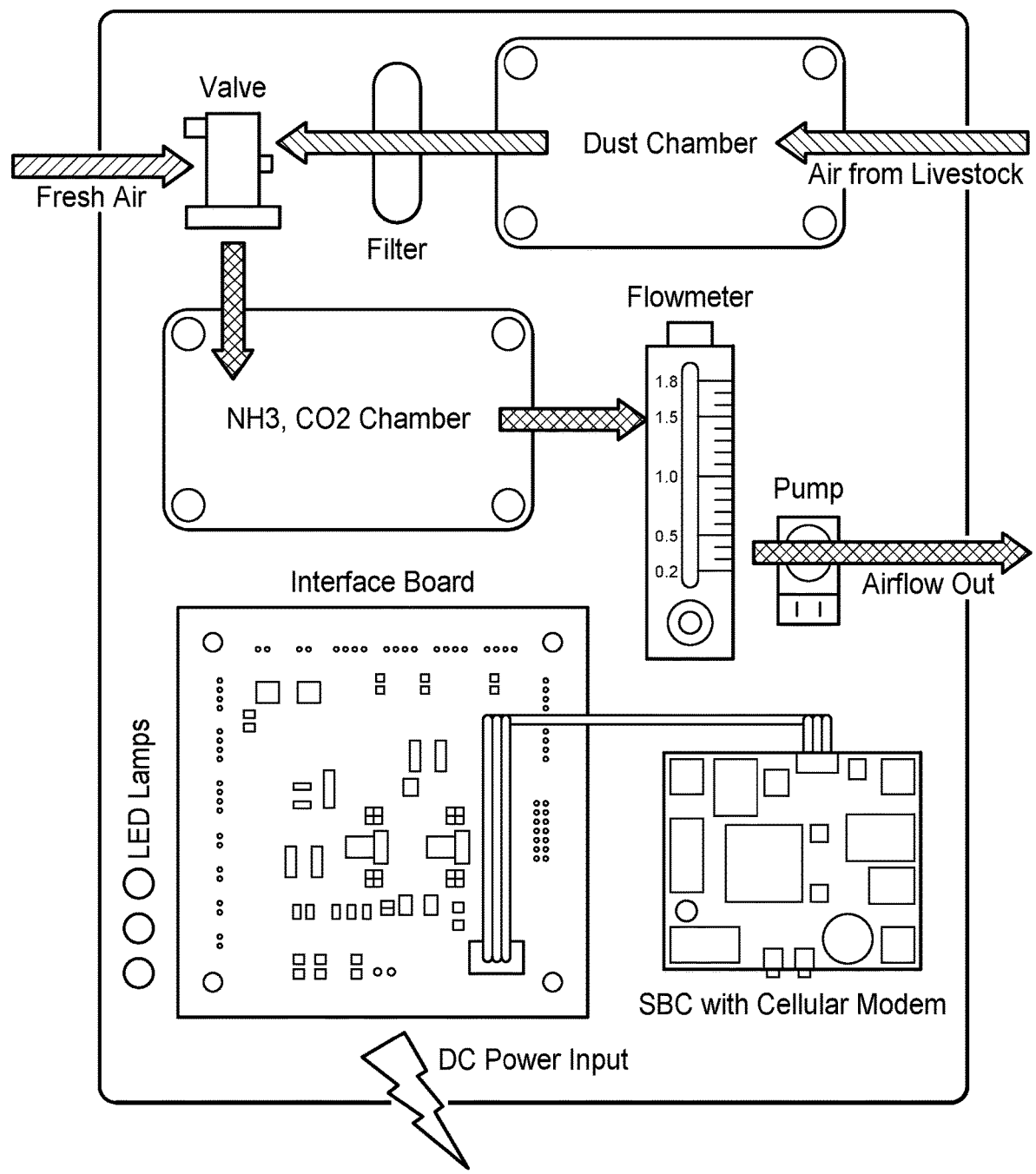
FIG. 5 is an image of the inside of the apparatus.

As further illustrated in FIG. 3, the temperature and humidity sensors 24 and 26 are mounted on a retractable lead 124. The enclosure 120 includes a protective cover 126 that is configured to enclose the sensors 24 and 26 when the lead is in the retracted position and the sensors are not in use. The protective cover 126 enables the apparatus 10 to be washed and disinfected between farm visits without damaging sensors 24 and 26.

There are other factors that could be measured within the closed environment of a livestock building including airborne micro-organism concentration and internal airspeed. When the apparatus is used in countries other than Australia it may be desirable to test other airborne pollutants. For instance, in cooler climates the production of carbon monoxide would be tested because of the lower ventilation rates and the use of heaters. Similarly, high hydrogen sulfide and methane concentrations are associated with the storage of pig slurry during cold periods.

The skilled addressee will now appreciate the many advantages of the present invention for an air quality measurement apparatus. The apparatus 10 provides a practical instrumentation kit for monitoring airborne pollutants. The carbon dioxide sensor and ammonia sensor are small which means that the apparatus 10 can be of a size that allows for easy transport, maintenance, and operation in the field. The size and weight of the monitoring hardware is significantly reduced to improve ease of installation and transport. The labour input required for operating the apparatus 10 is reduced and therefore the cost of air quality monitoring is minimized. The improved air quality monitoring kit 10 will enable producers and industry consultants to undertake air quality measurements routinely on farms and therefore reduce the Occupational Health and Safety risks for workers, improve environmental outcomes and potentially improve animal health/production efficiency.

Another important result in the present apparatus is that by comparing real time data one can determine whether or not the building is "operating" according to its specification—that is whether or not is provides the appropriate environmental conditions for the housing of animals especially pigs and poultry. This allows the user to determine what if any parameters need to change, such as the density of animals in the building, the ventilation rates and what further improvements may need to be made such as dust extraction.

The present invention thus teaches an instrument that measures various parameters both inside and outside of an area that provides users one with a real time analysis which can be used to fine tune the ventilation for animals in a controlled space such as a shed. This is in contrast to current instruments.

An analysis of the data then gives the user an idea of the production efficiency and environmental conditions. Whilst periodic sampling has been used beforehand continuous sampling has not. In order to provide continuous sampling, the instrument has had to be redesigned to ensure that the data is accurate.

For example, the instrument may include sensors such as ammonia sensors and/or dust sensors that may over time lose their accuracy and reliability because the sensors may become blocked or compromised. The present invention eliminates or reduces this problem by teaching purge periods of the sensors.

There is typically provided a sampling cycle per hour, in a preferred embodiment of say 15 minutes per hour. Every 15 minutes the air that is passed into the instrument is changed from that collected within the controlled space to that sampled externally. The time may change according to the particular application, but there will be a period where external air is passed into the instrument. This has a number of benefits including measuring outside concentrations for example of $CO_2$. The behaviour of the sensors is also automatically observed, such as how fast they come back to being recalibrated or measure normal outside levels and basically assess whether the sensor heads need to be replaced.

Thus, the sensors provide the user with information of the inside conditions of a building, compared to the outside. The sensors are all then purged (cleaned) and if they don't come to measure what has been measured outside the user knows that there is an error.

Thus, the present invention is for a system that predicts the behaviour and reliability of the measurements. It is effectively checking itself to make sure that the data provided is accurate.

The system also controls the flow rate by having a valve at the bottom end so that the incoming air travels directly into the sensors and therefore there is no argument of the air sample being contaminated or reduced.

Furthermore, the purging of the system also extends the shelf life/useful life of the sensors. Not only does the purging extend the shelf life of the sensors but by monitoring the behaviour of the sensors both the purging and sampling time are minimised enough to get reliable measurements. This not only saves the useful life of the sensors but also the electric pump. Thus, the system is a self-cleaning system.

The advantages of the present invention thus are:
a. Dust monitoring is continuous and incorporated into one single box.
b. It calculates and thus monitors ventilation rates in real time based on 'carbon dioxide' balance method.
c. The emission rates are calculated in real time.
d. The apparatus predicts concentrations based on features of the building and compare it with measured values to see if the building is over/under preforming in terms of their environmental credentials.
e. It measures airspeed and if needed methane and H2S.
f. It uses a single board computer, communication capability—thus the information is available on line and in real time. However it can be stored for future analysis if needed.
g. The information can be sent to the same database as the weight information where it correlates weight gain with environmental conditions.
h. The sensors can be cleaned or purged by a flow of air eternal to the space being measured providing data to the user whether or not the sensors are clean or compromised and need to be replaced.

LIST OF COMPONENTS 10 apparatus
12 gas concentration monitoring device
14 sample line
16 sample line
18 dust monitoring device
20 sample line 22 sample line
24 relative humidity sensor
26 temperature sensor
28 piggery building
30 walls
32 roof
34 floor
36 building interior
38 A-ridge vent
40 livestock
42 walkway
50 vacuum pump
54 carbon dioxide sensor
56 ammonia sensor
58 data logger
88 measurement device
92 in-line pre-filter
94 Venturi tube
96 sample filter
104 in-line pre filter
120 enclosure
122 enclosure
124 retractable lead
126 protective cover The following detailed description of the invention refers to a particular embodiment. Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In the summary of the invention, except where the context requires otherwise due to express language or necessary implication, the word "comprising" is used in the sense of "including", i.e. the features specified may be associated with further features in various embodiments of the invention.

The invention claimed is:

1. An air quality measurement apparatus, comprising:
   a first air inlet provided on the apparatus, wherein the first air inlet originates within a space in which air quality is to be determined;
   a second air inlet provided on the apparatus, wherein the second air inlet originates outside the space;
   at least one sensor provided on the apparatus;
   a device operable to draw a first air sample from within the space through the first air inlet and to pass the first air sample over the at least one sensor; wherein the at least one sensor measures the first air sample for a first environmental condition;
   an air outlet for expelling the first air sample from the apparatus;
   wherein the device is further operable to draw a second air sample from outside the space through the second air inlet and to pass the second air sample over the at least one sensor; wherein the at least one sensor measures the second air sample for a second environmental condition;
   wherein the apparatus compares the first environmental condition and the second environmental condition with one another and provides data to a user regarding the air quality within the space; and
   wherein at pre-determined intervals the second air inlet provides a continuous flow of air from outside the space for a pre-set time to remove any contaminates from the at least one sensor.

2. The air quality measurement apparatus as in claim 1, wherein the at least one sensor is a plurality of sensors, and the wherein the plurality of sensors include a gas concentration monitoring device and a dust monitoring device.

3. The air quality measurement apparatus as in claim 2, wherein the plurality of sensors measure different parameters including concentrations of $CO_2$, ammonia, and dust.

4. The air quality measurement apparatus as in claim 2, wherein the plurality of sensors includes other sensors measuring temperature, relative humidity and gas concentration.

5. The air quality measurement apparatus as in claim 4, wherein a flow rate through the gas concentration sensors is in the range of under 1 L/min.

6. The air quality measurement apparatus as in claim 1, further comprising a computing device for recording information from said at least one sensor.

7. The air quality measurement apparatus as in claim 2, wherein the dust concentration monitoring device includes a sensor which measures the concentration of inhalable particles less than 20 μm in size, and respirable particles less than 5 μm in size.

8. A method of determining air quality within a defined space comprising:
   providing an air quality measuring apparatus having a first air inlet and a second air inlet in operative communication with at least one sensor;
   originating the first air inlet within the defined space;
   originating the second air inlet outside the defined space;
   drawing a first air sample from the defined space and into the apparatus through the first air inlet;
   passing the first air sample over the at least one sensor;
   measuring a first environmental condition of the first air sample with the at least one sensor;
   expelling the first air sample from the apparatus;
   drawing a second air sample from outside the defined space and into the apparatus through the second air inlet;
   passing the second air sample over the at least one sensor;
   measuring a second environmental condition of the second air sample with the at least one sensor;
   comparing the first environmental condition and the second environmental condition with one another;
   determining the quality of the air within the defined space from the comparison of the first environmental condition and the second environmental condition;
   providing a continuous flow of air from outside the space through the second air inlet at pre-determined intervals and for a pre-set time; and
   removing any contaminates from the at least one sensor using the continuous flow of air from outside the space.

9. The method according to claim 8, further comprising:
   providing a plurality of sensors as the at least one sensor; and wherein the plurality of sensors includes a gas concentration monitoring device and a dust monitoring device.

10. The method according to claim 9, further comprising:
    measuring, with the plurality of sensors, different parameters including concentrations of $CO_2$, ammonia, and dust.

11. The method according to claim 9, further comprising measuring temperature, relative humidity and gas concentration with the plurality of sensors.

12. The method according to claim 11, further comprising causing air to flow through a gas concentration sensor at a flow rate in the range of under 1 L/min.

13. The method according to claim 8, further comprising recording information from said at least one sensor with a computing device.

14. The method according to claim 8, wherein the at least one sensor includes a dust concentration monitoring device sensor; and the method further comprises:

measuring with the dust concentration monitoring device sensor the concentration of inhalable particles less than 20 µm in size, and respirable particles less than 5 µm in size.

* * * * *